United States Patent

Barnhart

[11] Patent Number: 5,799,962
[45] Date of Patent: Sep. 1, 1998

[54] BOAT LAUNCHING/LOADING PLATFORM

[76] Inventor: Robert D. Barnhart, 1403 Roanoke, Graham, Tex. 76450

[21] Appl. No.: 742,659

[22] Filed: Nov. 4, 1996

[51] Int. Cl.$^6$ .................................................. B60R 3/00
[52] U.S. Cl. ........................... 280/166; 182/127; 182/84; 108/44; 108/131; 108/134
[58] Field of Search .................... 280/163, 164.1, 280/166; 182/127, 84; 108/42, 44, 48, 129, 130, 131, 132, 133, 134, 135, 152; 248/291.1, 188.6

[56] References Cited

U.S. PATENT DOCUMENTS

| | | | |
|---|---|---|---|
| 2,771,331 | 11/1956 | Messman | 108/135 X |
| 2,969,249 | 1/1961 | Fox | 108/131 X |
| 3,057,670 | 10/1962 | Russo | 108/48 |
| 3,357,719 | 12/1967 | McCrea | 280/163 |
| 3,495,850 | 2/1970 | Ziskal | 280/164.1 X |
| 4,005,898 | 2/1977 | Way | 108/130 X |
| 4,159,122 | 6/1979 | Stevens | 108/134 X |
| 4,720,116 | 1/1988 | Williams et al. | 280/166 |
| 4,878,800 | 11/1989 | Dell | 224/401 X |
| 5,090,335 | 2/1992 | Russell | 108/44 |
| 5,330,084 | 7/1994 | Peters | 248/291.1 X |
| 5,634,681 | 6/1997 | Gionta | 108/44 X |

FOREIGN PATENT DOCUMENTS 180966   10/1966   U.S.S.R. .................... 280/166

*Primary Examiner*—Peter M. Cuomo
*Assistant Examiner*—Janet M. Wilkens
*Attorney, Agent, or Firm*—Jones, Day, Reavis & Pogue

[57] ABSTRACT

A vehicle attachment including an elongated platform pivotally attached along one side of a vehicle for movement between a vertical carrying position adjacent the side of the vehicle and a second horizontal position to enable a user to walk along the side at the rear of the vehicle when launching a boat into a body of water or during recovery of the boat without requiring the user to get into the water.

10 Claims, 2 Drawing Sheets

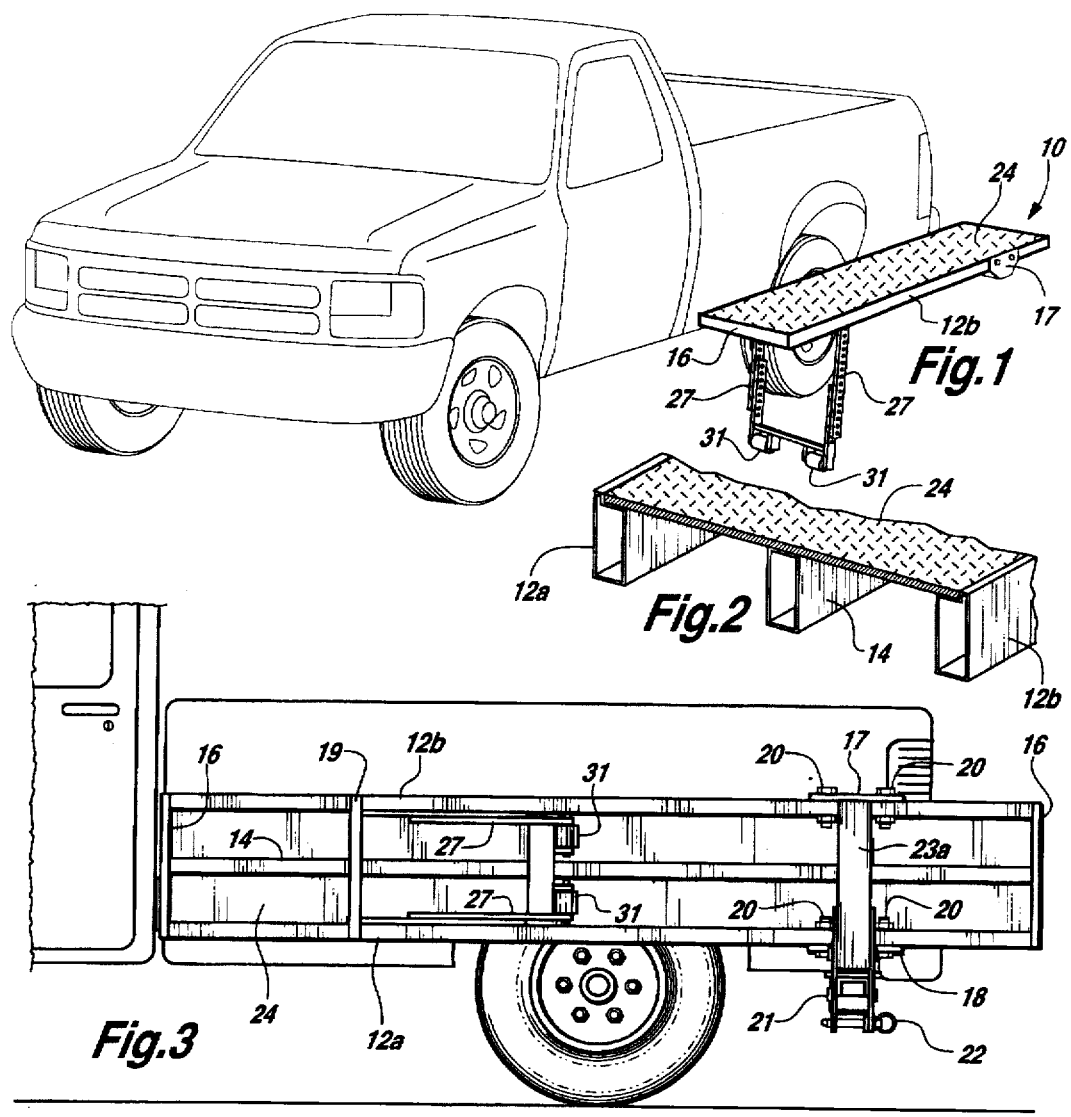
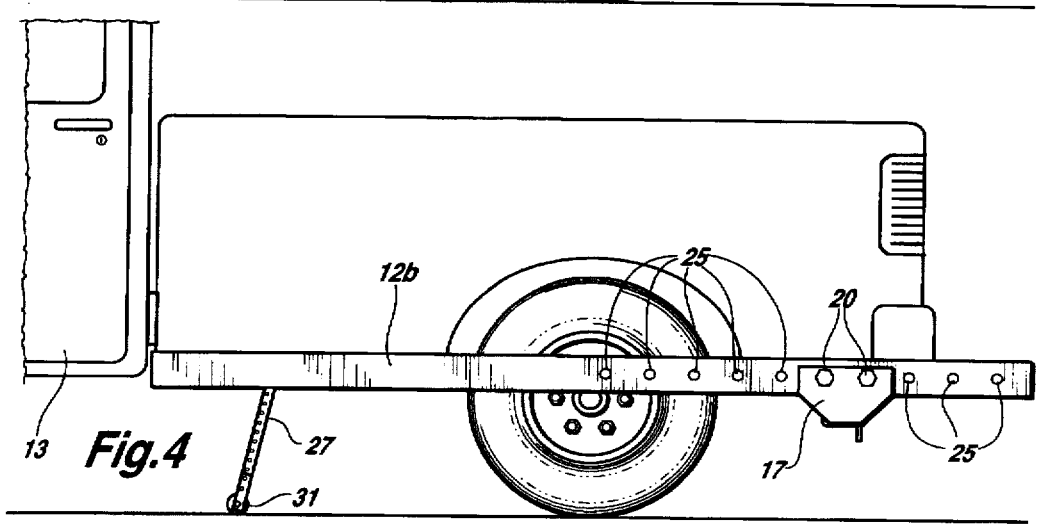

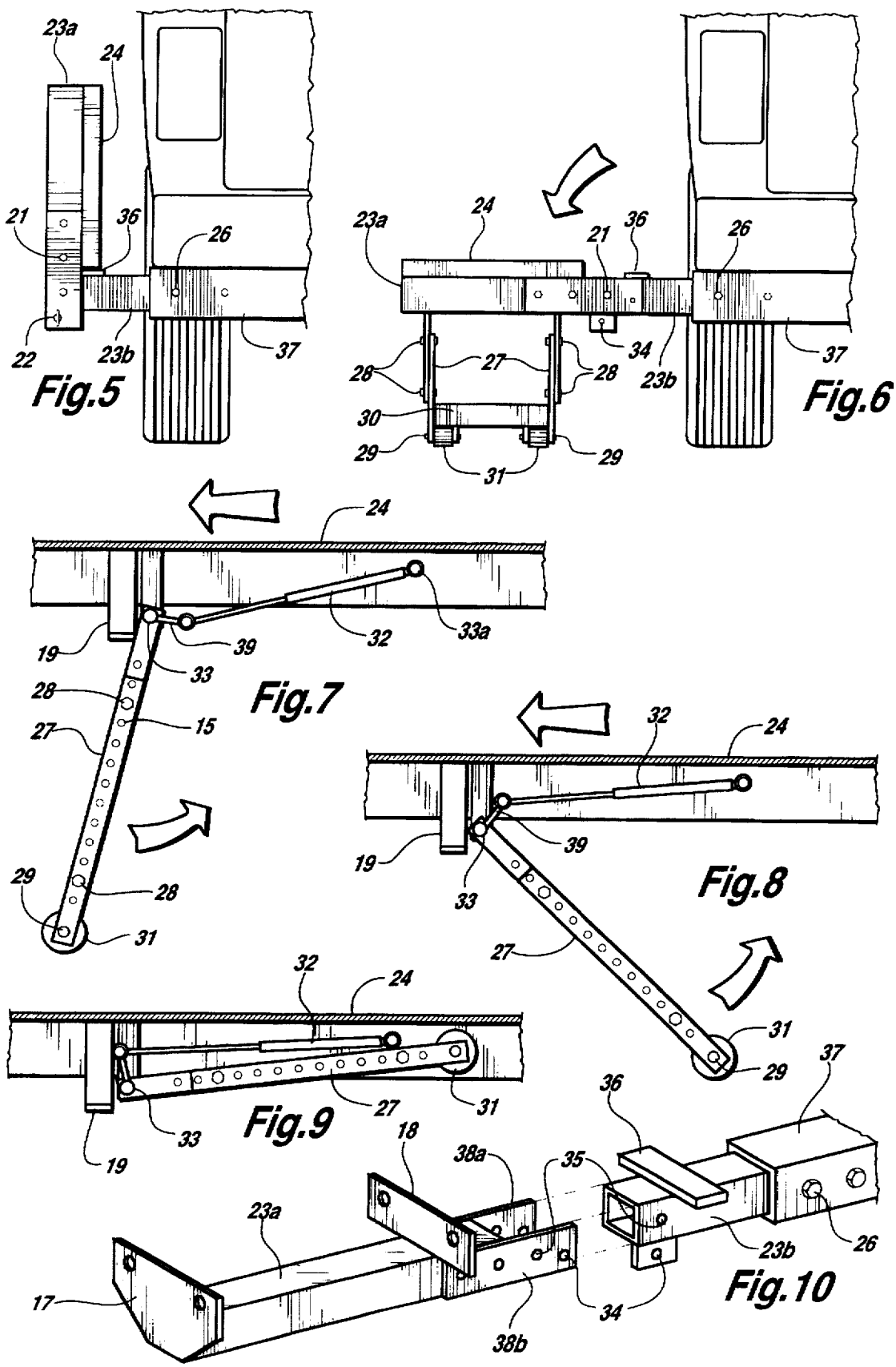

BOAT LAUNCHING/LOADING PLATFORM

CROSS-REFERENCES TO RELATED APPLICATIONS

This application claims the benefits of provisional application Ser. No. 60/016,443, filed Apr. 29,1996.

BACKGROUND OF THE INVENTION

1. FIELD OF THE INVENTION

The present invention relates in general to vehicle attachments and in particular to a vehicle attachment for aiding in the launching and recovery or loading of watercraft, such as boats, off and on trailers into or from a body of water so as to keep the operator from getting wet.

2. DESCRIPTION OF RELATED ART INCLUDING INFORMATION DISCLOSED UNDER 37 CFR 1.97 AND 1.98

In the procedure of launching or loading watercraft such as boats (off and on trailers) the trailer must be backed into water far enough to partially float the watercraft (hereinafter referred to as "boat"). Usually when this is accomplished, the towing vehicle is also so far into water that, when the driver steps out, he or she must wade in water to get to the boat. This invention allows one person to launch or load a boat without getting wet.

It would be advantageous to have a walkway attachment connected to the side of the towing vehicle such that, when the boat trailer has been backed into the water, the attachment can be deployed to enable an operator to walk on the attachment back to the boat trailer to release the boat from the trailer without getting wet.

SUMMARY OF THE INVENTION

The present invention provides such an attachment that forms a walkway along the side of the towing vehicle from the vehicle driver's compartment to the boat that will allow one person to launch, or load a boat to, or from, a body of water without the need of getting wet; the invention provides a portable (temporary) walkway that may be attached to or removed from the vehicle in less than two minutes; provides a walkway that is lightweight, never needs painting, and may be used by most anyone; and provides a walkway with traction that should not be slippery if wet.

BRIEF DESCRIPTION OF THE DRAWINGS

These and other features of the present invention will be more fully disclosed when taken in conjunction with the following DETAILED DESCRIPTION OF THE PREFERRED EMBODIMENT(S) in which like numerals represent like elements and in which:

FIG. 1 illustrates the present invention as it looks mounted on the side of a vehicle and in the folded-down position;

FIG. 2 is a cross-sectional view of the walkway of the present invention showing how the basic walkway is constructed;

FIG. 3 is a view of the bottom of the unit showing it in the folded-up carrying position;

FIG. 4 shows the outer edge of walkway in the folded-down or "use" mode;

FIG. 5 is tear end view of the walkway in the folded-up or carrying position and also shows the pivot point of a mounting arm for the walkway;

FIG. 6 is a view from the rear with the walkway in the folded-down position;

FIG. 7 is an enlarged side view of a folding leg support, leg stop, and gas spring on the front portion of the walkway;

FIG. 8 is another side view of the leg support illustrating how it folds up;

FIG. 9 shows the leg support in the up position and the mechanism for holding it there; and FIG. 10 is a view of the support arm in detail showing the walkway mounting hinge point and the mounting receptacle.

DETAILED DESCRIPTION OF THE DRAWINGS

Reference numerals used in the drawings are set forth and defined as follows:
10 walkway
12a and 12b rectangular tubing
13 vehicle door
14 rectangular tubing
15 orifices
16 rectangular bar
17 flange
18 flange
19 leg stop
20 bolt
21 bolt
22 quick disconnect pin
23a and 23b support arm
24 floor of walkway
25 adjustment orifices
26 quick disconnect pin or bolt
27 leg support
28 bolt
29 bolt
30 gusset
31 roller
32 gas spring
33 shaft
33a attachment point
34 orifice
35 pivot point orifice
36 stop bar
37 mounting receptacle
38a and 38b hinge plates
39 cantilever arm

DETAILED DESCRIPTION OF THE PREFERRED EMBODIMENT(S)

The preferred embodiment of the walkway 10 of this invention is illustrated in FIG. 1. This shows how the walkway 10 looks mounted on side of vehicle, folded down, and ready to use. A special extruded T6 aluminum alloy tubing 12a and 12b (FIG. 2) is used for the sides of framework 10. A length of rectangular T6 aluminum tubing 14, for example, ¾"×1½", is used as a center support for floor 24. Floor 24 is a diamond tread aluminum plate. Each end 16 of the walkway is capped off with a T6 aluminum rectangular bar 16, for example, ⅜"×1½". FIG. 3 shows the bottom of walkway when it is folded up in the carrying position. The three lengths of rectangular tubing 12a, 12b, and 14 are welded to a length of the rectangular bar 16 on each end to form a framework. Diamond tread aluminum plate 24 is skip welded to the bars 12a, 12b, and 14 on the underside of plate 24 to complete the basic walkway 10.

A folding support arm 23a is pivotally attached to rigid arm 23b (best shown in FIGS. 5 and 6) and is constructed of steel. Pivot point 21 may be a machine bolt or a quick disconnect pin. Walkway 10 is joined to support arm 23a by four machine bolts 20 that may be ⅝"×1¾" (FIG. 3). It is held in the carrying (vertical or folded-up) position by quick disconnect pin 22 (FIGS. 3 and 5). Support arms 23a and 23b will be detailed more fully in FIG. 10.

FIG. 4 is a side view of walkway 10 mounted on a vehicle with the leg support 27 in the down position. Note adjustment holes or orifices 25 that allow for the walkway 10 to be properly positioned by moving it toward the front or rear of the vehicle in increments such as four inches.

The folding leg support 27 (FIG. 6) is actually formed of two legs that are welded to a rotating axle or shaft 33. The legs are of T6 aluminum rectangular bar, for example, 5/16"×1". Each leg 27 consists of two sections with matching 5/16" holes or orifices 15 that are at one-inch increments. This allows for correct length adjustment to match the walkway mounting height on a vehicle. Legs 27 are held at this length by four (5/16"×1") machine bolts 28. The two legs 27 are joined (welded) together just above the bottom thereof by a crosspiece gusset plate 30. At the very bottom, at each side of support 27, is a roller 31.

Side views of the folding leg support 27 mechanism are shown in FIGS. 7, 8, and 9. Leg stop 19 may be formed of 1/4"×1" T6 aluminum bar. Its function is to stop the clockwise rotation of the leg support 27 when the leg reaches the position shown in FIG. 7. The leg 27 is welded to the rotating or pivotable shaft 33. A short cantilever arm 39 is welded to shaft 33, and a spring mechanism 32, such as a gas spring, is pivotally attached to one end to cantilever arm 39 and pivotally attached to the bottom of walkway 10 at point 33a. It will be noted that the distance between pivot points 33 and 33a is shorter than the combined length of spring mechanism 32 and cantilever arm 39. Therefore, the spring mechanism 32 must compress and extend during the movement of support leg 27 between its folded position and its extended support position. Thus, the spring mechanism 32 applies pressure to leg support 27 to maintain it in either its folded or extended support position. The leg 27 is pulled down (or out, if walkway 10 is in the vertical carrying position) until it passes a 90° angle to the walkway 10. The gas spring 32 applies pressure to cantilever arm 39 which causes a clockwise rotation of the shaft. Leg 27 is formed against leg stop 19 and is held there by pressure applied by gas spring 32.

FIG. 8 illustrates how the gas spring 32 can actually lift the leg 27 to the folded-up position. Pressure applied to cantilever arm 39 here is rotating shaft 33 in a counter-clockwise direction which lifts leg 27 and holds it in the position shown in FIG. 9. This is a novel and very important feature that is ideally suited to the situation in the event the driver forgets that leg 27 is in the down (support) position and moves the vehicle forward a sufficient distance and the leg 27 comes in contact with a rock, hump, or some other object. Had the leg been solidly locked in the down position with a pin, bolt, or such, damage would surely occur. However, with the unique design utilizing the gas spring mechanism 32, the leg 27 will not only fold out of harm's way, but can automatically recess to the carrying position (FIG. 9).

FIG. 10 is a view of folding support arm 23a pivotally attached to rigid support 23b. Thus, the arm has the two sections, 23a and 23b. The two are hinged together at pivot point 35 with a (for example, 3/8"×3 1/2") machine bolt (not shown). Stop bar 36 serves two purposes. When folding walkway 10 from the horizontal to the vertical position, the stop bar 36 will stop the walkway 10 when it reaches the true vertical position, not touching the side of the vehicle, as can be seen in FIG. 5. A "quick pin" may be inserted in hole 34 to hold the walkway 10 in this vertical position (see FIG. 5). When folding the walkway 10 down, bar 36 will both stop movement of and support the walkway 10 in the horizontal position (see FIG. 6). Walkway 10 mounts to support arm 23a by flanges 17 and 18 and four (5/16"×1 3/4") machine bolts 20 (see FIG. 3).

Mounting receptacle 37 is a hollow steel structure that is rigidly attached to the vehicle. Support arm 23b is "lugged in" to the receptacle 37 and a "quick pin" or bolt 26 is inserted to secure it there.

The entire walkway 10, including fold-down leg support 27 is constructed of sufficiently strong aluminum alloy (except for steel bolts and plastic rollers).

The support arm assembly (23a and 23b) is constructed of mild steel and then cadmium plated. This is the most preferred embodiment. The total apparatus could be built entirely of steel or other sufficiently strong material.

The addition of a fold-down step (not shown) to the front end of the walkway might be advantageous. This would allow easy access to the walkway 10 from ground level.

The suggested manner of using the boat launching/loading walkway 10 is as follows: A mounting receptacle 37 (FIG. 5) is attached to a vehicle at any convenient location on the vehicle having sufficient strength to hold the walkway 10. Support arm 23b is inserted into receptacle 37 and is secured there by pin or bolt 26. The walkway is now in the carrying position. Now swing out folding leg support 27 to the position shown in FIG. 7. Pull "quick pin" 22 (FIG. 5) and fold down to FIG. 6 position. Adjust the length of the support leg 27 so that rollers are approximately 1 1/2" above ground level. This is accomplished with four bolts 28. Next, adjust the forward/backward position so that walkway 10 extends to the rear of the back bumper approximately 6 inches (FIG. 4). Be sure that front of walkway 10 will not interfere with opening the driver's door 13. This adjustment is made with the four bolts 20 and proper matching holes 25. (These adjustments will be necessary the first time unit is mounted on vehicle only.) Return walkway 10 to its carrying position shown in FIG. 5, and it is now ready for travel.

To launch or load boat: While walkway 10 is still in the carrying (vertical) position, back vehicle and trailer down launching ramp until rear of towing vehicle is within a few feet of waters' edge. Get out of vehicle at this point and swing out leg support 27 (FIG. 7) until it "locks" in the down position. Pull "quick pin" 22 (FIG. 5) and fold down walk to horizontal position (FIG. 6). Now you are ready to back vehicle and trailer into water deep enough for easy launching. To get to the boat, "walk the walk".

Reverse procedure after getting the boat from the water (fold unit back to carrying position) before moving vehicle from launching ramp. However, if driver forgets walkway 10 is in the down position and, in the process of moving the vehicle, the leg support 27 comes into contact with a solid object, the leg support 27 will automatically fold out of harm's way.

When walkway 10 is not needed, pull "quick pin" 26 and remove the entire unit from the vehicle.

Mounting or removing walkway 10 should take less than two minutes time.

Accordingly, it will be seen that the walkway of this invention can be used by most anyone easily and conveniently, and can be installed or removed easily and very quickly. The walkway has the additional advantages in that it permits one person to easily launch or load a boat without getting wet; it provides foot traction that should not be slippery when wet; the walkway is constructed of strong, lightweight T6 aluminum that never needs painting; the support leg has an automatic fold-up feature that prevents damage with misuse; and the walkway folds up to a traveling position.

The corresponding structures, materials, acts, and equivalents of all means or step plus function elements in the claims below are intended to include any structure, material, or act for performing the function in combination with other claimed elements as specifically claimed.

I claim:

1. A vehicle having an attachment for aiding a user in the launching and recovery of boats on a boat trailer to and from a body of water, the vehicle having a front, a rear, and opposing sides, the vehicle attachment comprising:

a mounting bracket rigidly attached to said vehicle and having an outer end extending outwardly from one of said opposing sides;

an elongated platform having a top and a bottom and a front and a rear, said platform being pivotally attached to said mounting bracket outer end allowing pivotal movement of said platform between a vertical carrying position and a horizontal plane "in use" position; and a stop bar attached to said mounting bracket limiting pivotal movement of said platform such that in the vertical carrying position said platform is adjacent to but not touching the side of the vehicle and in the horizontal plane can be used as a walking platform by the user when the boat trailer is in the water to enable the user to move along the platform above the water to the boat trailer to launch or recover the boat.

2. The vehicle attachment as in claim 1 further including a foldable support leg having first and second ends and being pivotally attached to the bottom of said elongated platform at the first end at a distance from said mounting bracket for maintaining said platform in the horizontal plane, said support leg being foldable against the bottom of said platform in a first position and pivotally extended outwardly from said platform to a second position to support said platform in the horizontal plane.

3. The vehicle attachment as in claim 2 further including:

a resilient spring piston having first and second ends and being attached to the bottom of said platform at said first end; and a cantilever arm having a first end pivotally attached to said second end of said resilient spring piston and a second end rigidly attached to said foldable support leg at its pivot such that said resilient spring piston tends to hold the support leg in both its foldable first position and its extended second position.

4. The vehicle attachment as in claim 3 wherein the distance between said first end of said resilient spring piston and the pivot of said foldable support leg is less than the combined lengths of said resilient spring piston and said cantilever arm such that the resilient spring piston must compress and extend during movement of said support leg between its first foldable position and its second extended position thereby applying pressure to said support leg to maintain it in either its first folded position or its second extended position.

5. The vehicle attachment as in claim 4 wherein said resilient spring piston is a gas piston.

6. The vehicle attachment as in claim 2 wherein said foldable support leg is adjustable in length.

7. The vehicle attachment as in claim 2 further including wheels on the second end of said foldable support leg to aid in automatically folding said foldable support leg to its first position if said vehicle is moved forwardly with said foldable leg support extended in its second position.

8. A vehicle attachment as in claim 1 further including a first quick disconnect pin for pivotally attaching said platform to said mounting bracket to enable said platform to be easily and quickly attached to said vehicle.

9. A vehicle attachment as in claim 1 further including a non-slip surface on the top of said platform to assist the user in walking thereon.

10. A vehicle attachment as in claim 8 further including a second quick disconnect pin spaced from said first quick disconnect pin to lock said platform in its vertical position.

* * * * *